US006942723B2

(12) United States Patent
Yatake et al.

(10) Patent No.: US 6,942,723 B2
(45) Date of Patent: Sep. 13, 2005

(54) WATER-BASE INK AND INK SET USING THE SAME

(75) Inventors: Masahiro Yatake, Nagano-ken (JP); Jun Ito, Nagano-ken (JP); Motoki Masuda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

(21) Appl. No.: 10/841,211

(22) Filed: May 7, 2004

(65) Prior Publication Data

US 2004/0237838 A1 Dec. 2, 2004

(30) Foreign Application Priority Data

| May 13, 2003 | (JP) | 2003-134818 |
|---|---|---|
| Jul. 31, 2003 | (JP) | 2003-204707 |
| Jul. 31, 2003 | (JP) | 2003-204708 |
| Jul. 31, 2003 | (JP) | 2003-204709 |

(51) Int. Cl.$^7$ .............................................. C09D 11/00
(52) U.S. Cl. ........................ 106/31.78; 106/31.86; 106/31.89
(58) Field of Search ............................ 106/31.78, 31.86, 106/31.89

(56) References Cited

U.S. PATENT DOCUMENTS

| 2,083,372 | A | | 6/1937 | Guthmann | |
|---|---|---|---|---|---|
| 5,156,675 | A | | 10/1992 | Breton et al. | |
| 5,183,502 | A | | 2/1993 | Meichsner et al. | |
| 5,196,056 | A | | 3/1993 | Prasad | |
| 6,524,383 | B2 | * | 2/2003 | Komatsu et al. | 106/493 |
| 6,730,155 | B2 | * | 5/2004 | Gotoh et al. | 106/31.86 |
| 6,776,830 | B2 | * | 8/2004 | Marritt | 106/31.68 |
| 2003/0097960 | A1 | * | 5/2003 | Ito et al. | 106/31.58 |
| 2003/0097961 | A1 | * | 5/2003 | Yatake et al. | 106/31.59 |
| 2003/0106462 | A1 | * | 6/2003 | Yatake et al. | 106/31.59 |
| 2003/0226473 | A1 | * | 12/2003 | Ishimoto | 106/31.6 |
| 2004/0016367 | A1 | * | 1/2004 | Koike et al. | 106/31.86 |
| 2004/0020407 | A1 | * | 2/2004 | Kato | 106/31.6 |

FOREIGN PATENT DOCUMENTS

| JP | 56-147861 | 11/1981 |
|---|---|---|
| JP | 62-9536 | 1/1987 |
| JP | 01-170672 | 7/1989 |
| JP | 01-301760 | 12/1989 |
| JP | 05-039447 | 2/1993 |
| JP | 05-064724 | 3/1993 |
| JP | 06-313141 | 11/1994 |
| JP | 09-111165 | 4/1997 |
| JP | 10-025440 | 1/1998 |
| JP | 10-140065 | 5/1998 |
| JP | 10-219166 | 8/1998 |
| JP | 11-275376 | 10/1999 |
| JP | 2000-086920 | 3/2000 |
| JP | 2001-002962 | 1/2001 |
| JP | 2003-119407 | 4/2003 |
| JP | 2003-253146 | 9/2003 |

OTHER PUBLICATIONS

English language abstract of JP 56–147861, dated Nov. 17, 1981.
English language abstract of JP 62–95366, dated Jan. 5, 1987.
English language abstract of JP 01–170672, dated Jul. 5, 1989.
English language abstract of JP 01–301760, dated Dec. 5, 1989.
Patent Abstracts of Japan and JPO computer–generated English translation of JP 2001–002962, dated Jan. 9, 2001.
Patent Abstracts of Japan and JPO computer–generated English translation of JP2000–086920, dated Mar. 28, 2000.
Patent Abstracts of Japan and JPO computer–generated English translation of JP 2003–253146, dated Sep. 10, 2003.
Patent Abstracts of Japan and JPO computer–generated English translation of JP 10–025440, dated Jan. 27, 1998.
Patent Abstracts of Japan and JPO computer–generated English translation of JP 11–275376, dated Oct. 8, 1999.
Patent Abstracts of Japan and JPO computer–generated English translation of JP 09–111165, dated Apr. 28, 1997.
Patent Abstracts of Japan and JPO computer–generated English translation of JP 06–313141, dated Nov. 8, 1994.
Patent Abstracts of Japan and JPO computer–generated English translation of JP 10–140065, dated May 26, 1998.
Patent Abstracts of Japan and JPO computer–generated English translation of JP 05–064724, dated Mar. 19, 1993.
Patent Abstracts of Japan and JPO computer–generated English translation of JP 10–219166, dated Aug. 18, 1998.
Patent Abstracts of Japan and JPO computer–generated English translation of JP 2003–119407, dated Apr. 23, 2003.
Patent Abstracts of Japan and JPO computer–generated English translation of JP 05–039447, dated Feb. 19, 1993.

* cited by examiner

Primary Examiner—Helene Klemanski
(74) Attorney, Agent, or Firm—Ladas & Parry

(57) ABSTRACT

This invention provides an water-base ink achieving high print quality on plain, recycled, and coated paper, glossiness on glossy paper, as well as well-balanced gas fastness, and an water-base ink set which exhibits low light source dependence with regard to the colors of resultant printed matter. This invention is an water-base ink comprising a pigment, a surfactant and/or a penetrating organic solvent, and water, wherein the pigment is a copper phthalocyanine pigment substituted with eight or less chlorine atoms; the surfactant is an acetylene glycol surfactant and/or an acetylene alcohol type surfactant; and the penetrating organic solvent is one or more selected from the group consisting of di(tri)ethylene glycol monobutyl ether and/or (di)propylene glycol monobutyl ether, and 1,2-allylene glycol. This invention is also an water-base ink set comprising the water-base ink, a magenta ink and a yellow ink.

20 Claims, No Drawings

WATER-BASE INK AND INK SET USING THE SAME

BACKGROUND OF THE INVENTION

1. Field of the Invention

The present invention relates to an water-base ink achieving high print quality on plain, recycled, and coated paper, resulting in good glossiness on glossy paper, and having well-balanced gas fastness, and relates to an water-base ink set which will exhibit low light source dependence with regard to the colors of resultant printed matter.

2. Description of Prior Art

An inkjet recording method is a method for discharging ink droplets from microscopic nozzles to record letters and graphics on a surface of a recording medium. Practical methods using such inkjet recording method include a method for converting electrical signals into mechanical signals using electrostrictive elements and intermittently discharging ink loaded in a nozzle head so that the letters and symbols are recorded on a surface of a recording medium, and a method for rapidly heating some portion of an ink closest to a discharging part of the nozzle head to generate foam and intermittently discharge the ink due to volumetric expansion so that letters and marks are recorded on a surface of a recording medium.

Inks to be used in these inkjet recording methods are required, when printing on a recording medium, that is paper, to resist smearing, have good drying characteristics and properties so that adjacent colors do not mix during multicolor printing such as color printing, as well as to have gas fastness and light fastness, and to exhibit low light source dependence with regard to the colors of the resultant printed matter.

Examples of means to satisfy such requirements are described in Japanese Patent Laid-Open Publication No. H10-025440, which discloses a method to improve light fastness by using pigment blue 15:3, and in Japanese Patent Laid-Open Publication No. H11-275376 which describes color-management methods.

For conventional color ink sets using pigments, a combination of pigment blue 15:3, pigment red 122, and pigment yellow 74 has been commonly used.

However, there is a problem with the combination of pigment blue 15:3, pigment red 122 and pigment yellow 74. It causes the phenomenon where the printed colors significantly differ according to the light source used when viewing the printed matter (light source dependence). "Light source dependence" refers to the phenomenon where the same printed colors looks different according to the light source used when viewing the printed matter. For example, a color looks different when viewed under the sun and when viewed under a fluorescent light. Typically, inks causing the phenomenon called metamerism tend to have light source dependence.

Neutral colors such as gray and khaki that are formed in the process called subtractive color mixture using cyan, magenta, and yellow, tend to have light source dependence. In the case of using inkjet inks, for example, when a gray color is made by combining pigment blue 15:3, pigment red 122, and pigment yellow 74, differences are made in the gray color according to the light sources used (light source dependence). The gray color looks yellowish-gray under the sun light and it looks bluish-gray under a fluorescent light. This phenomenon also occurs when combining pigment blue 15:4, pigment red 122 and pigment yellow 74.

With inkjet recording methods, there is another problem that it is impossible to achieve glossiness on glossy paper when the pigments have large particle diameters. Accordingly, it is preferable to use, in an inkjet recording method, pigments having small particle diameters so that glossiness can be achieved on glossy paper. However, when a copper phthalocyanine pigment having a small particle diameter is used as an ink for the inkjet recording, and when the printed matter is exposed to the atmosphere for a long period of time, only the cyan color composed by the copper phthalocyanine pigment deteriorates and discolors. This is because the copper phthalocyanine pigment has a low gas fastness and a poor balance with other colors (such as magenta, yellow, and black).

The present invention solves these problems. Therefore, it is an object of the present invention to provide an water-base ink achieving a high print quality on plain, recycled, and coated paper, achieving glossiness on glossy paper, and having a well-balanced gas fastness, and to provide an water-base ink set which will exhibit low light source dependence with regard to the color of the resultant printed matter.

SUMMARY OF THE INVENTION

The water-base ink of the present invention is a water-base ink comprising a pigment, a surfactant and/or a penetrating organic solvent, and water, wherein the pigment is a copper phtalocyanine pigment, which is C.I. pigment blue 15:1 substituted with from 1–8 chlorine atoms; the surfactant is an acetylene glycol surfactant and/or an acetylene alcohol type surfactant; and the penetrating organic solvent is one or more selected from the group consisting of di(tri) ethylene glycol monobutyl ether and/or (di)propylene glycol monobutyl ether, and 1 2-alkylene glycol.

Since the pigment is substituted with chlorine atoms, it is possible for an water-base ink to have enhanced gas fastness and a high coloring ability. It is also possible to provide an water-base ink set which will exhibit low light source dependence with regard to the colors of the resultant printed matter.

The ink set of the present invention consists of three or more types of water-base inks including a cyan ink, a magenta ink, and a yellow ink. Each of these inks, cyan, magenta, and yellow comprises a pigment, a surfactant and/or a penetrating organic solvent, and water. The pigment used in the cyan ink is a copper phthalocyanine pigment substituted with eight or less chlorine atoms; the surfactant is an acetylene glycol surfactant and/or an acetylene alcohol type surfactant; and the penetrating organic solvent is one or more selected from the group consisting of di(tri)ethylene glycol monobutyl ether and/or (di)propylene glycol monobutyl ether, and 1,2-alkylene glycol. Thus, it is possible to provide an water-base ink set which will exhibit low light source dependence with regard to the colors of the resultant printed matter.

DESCRIPTION OF THE PREFERRED EMBODIMENTS

[Water-Base Ink]

The water-base ink of the present invention is the result of a dedicated study for satisfying the requirements for an water-base ink, that is, having a good drying characteristic, little smearing of print on plain paper, sufficient coloring ability, high print quality on plain, recycled and coated paper, excellent gas fastness, and low light source dependence with regard to the colors of the resultant printed matter.

The water-base ink of the present invention contains a pigment, a surfactant and/or a penetrating organic solvent, and water. The pigment is a copper phthalocyanine pigment substituted with eight or less chlorine atoms, the surfactant is an acetylene glycol surfactant and/or an acetylene alcohol type surfactant, and the penetrating organic solvent is one or more selected from the group consisting of di(tri)ethylene glycol monobutyl ether and/or (di)propylene glycol monobutyl ether, and 1,2-alkylene glycol.

The pigment is the copper phthalocyanine pigment substituted with eight or less chlorine atoms. To achieve good coloring ability, the number of substituting atoms is preferably two to six per one copper phthalocyanine molecule, more preferably, three or four. If the number exceeds eight, the color of the pigment becomes close to green, the color reproducibility range narrows and the color representation degrades.

It is preferable that the copper phthalocyanine pigment be C.I. pigment blue 15:1. The structure of the copper phthalocyanine pigment is shown below where C.I. pigment blue 15:1 is substituted with eight or less chlorine atoms.
[Chemical Formula 1]

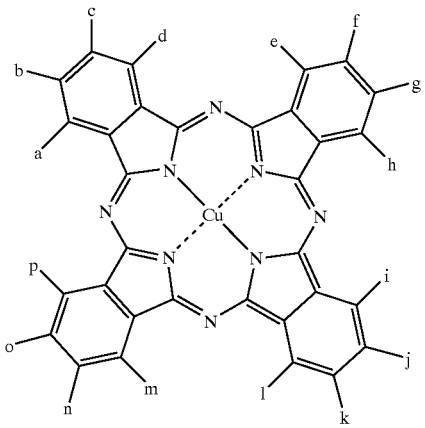

(In this formula, any one to eight of the reference letters a through p indicate chlorine atoms, while the rest indicate hydrogen atoms.)

In terms of glossiness, the mean particle diameter of the pigment is preferably 1 μm or less, more preferably 0.01 to 0.15 μm, most preferably 80 nm or less. With the mean particle diameter of 80 nm or less, the glossiness of printed matter on glossy paper is further enhanced.

Regarding water-base inks used in the inkjet among other water-base inks, the content of the copper phthalocyanine pigment ink is preferably 0.5 to 30 wt % (hereinafter "%" indicates "wt %"), more preferably 1.0 to 12%. If the content is less than that, the proper printing density is no longer guaranteed. If the content is more than that, there is a tendency that the ink viscosity will increase and the viscosity characteristics will begin to show structural viscosity. Accordingly, the ink discharge stability of the inks from the inkjet head will deteriorate.

It is preferable that the copper phthalocyanine pigment be encapsulated in a dispersion polymer. The dispersion polymer is preferably at least a copolymer of a dispersant having a polymerizable group and a monomer having a copolymerizable group.

The dispersant having a polymerizable group refers to a dispersant having at least three functional groups of a hydrophobic group, a hydrophilic group, and a polymerizable group. The polymerizable group of the dispersant refers to a compound having double bonds, for example, an acryloyl group, a methacryloyl group, an allyl group, and a vinyl group. Likewise, the copolymerizable group of the monomer refers to a compound having double bonds, for example, an acryloyl group, a methacryloyl group, an allyl group, and a vinyl group.

Examples of the copolymer component used in the dispersion polymer include polyacrylic acid ester, styrene-acrylic acid copolymers, polystyrene, polyester, polyamide, polyimide, silicon-containing polymers, and sulfer-containing polymers. One or more selected from the group above is selected as the dispersion polymer.

Since the dispersion polymer has, as its major constituent, one or more selected from the group consisting of polyacrylic acid ester, styrene-acrylic acid copolymers, polystyrene, polyester, polyamide, polyimide, silicon-containing polymers, and sulfer-containing polymers, the dispersion polymer is an impregnable polymer. Such a dispersion polymer is desirable in the sense that, even if one or more selected from the group consisting of an acetylene glycol surfactant and/or an acetylene alcohol type surfactant, a di(tri)ethylene glycol monomethyl ether and/or a (di) propylene glycol monobutyl ether, and a 1,2-alkylene glycol is added, it is not transformed and that an uniform particle diameter can be easily obtained.

Since the surfactant and the penetrating organic solvent used in the present invention cause an adsorption and desorption response to dispersants used in the ordinary pigment dispersion, they tend to cause a phenomenon in which printed matter is distorted due to the desorped dispersant. However, by using the aforementioned dispersion polymer, the adsorption and desorption response is prevented because the colorant is stably encapsulated in the dispersion polymer.

In term of the ink discharge stability and the prevention of clogging, an inkjet recording ink preferably contains a pigment in which particle diameters are relatively uniform. Accordingly, it is preferable that the colorant, (hereinafter sometimes referred to as "dispersed solution") in which the pigment is encapsulated in the dispersion polymer, be obtained by dispersing the copper phthalocyanine pigment with the dispersant having the polymerizable group, and thereafter, emulsifying the copper phthalocyanine pigment in water using a monomer and a polymerization initiator polymerizable with the dispersant.

The copper phthalocyanine pigment can be dispersed by ultrasonic dispersion, or by using a beads mill, a sand mill, a nanomizer or a jet mill. Among these, it is desirable to employ dispersion methods requiring no medium, for example, the nanomizer method and the jet mill method.

With the aforementioned dispersed solution, it is possible to obtain an inkjet recording ink having excellent stability. The dispersed solution may also be preferably applied to inks for writing materials.

It is preferable that the water-base ink of the present invention use, as its surfactant, either one or both of an acetylene glycol type surfactant and an acetylene alcohol type surfactants, so that the ink has a proper range of surface tension. These surfactants prevent the ink from spreading on plain paper and, for example, it is possible to suitably adjust the line width on a specific paper.

Examples of the acetylene glycol type compound preferably used in the present invention include Olfine E1010, STG, or Y (all product names, made by Nisshin Chemical), or Surfynol 82, 104, 440, 465 or 485 (all products names, made by Air Products and Chemicals Inc.).

Examples of the acetylene alcohol type compound preferably used in the present invention include 3,5-dimethyl-1-hexyne-3-ol, 2,4-dimethyl-5-hexyne-3-ol, and Surfynol 61 (product name, made by Air Products and Chemicals Inc.).

It is preferable that the content of the surfactant be 5% or less, more preferably 0.01% to 1.5%. If the content exceeds 5%, the effect of the surfactant on the print quality plateaus. Adding more of the substance only increases the ink viscosity and makes the ink be easily attached to the tip of the head. Accordingly, the resulting print is distorted.

In order to obtain a surface tension within a proper range, the water-base ink of the present invention preferably includes, as a penetrating organic solvent, one or more selected from the group consisting of di(tri)ethylene glycol monobutyl ethers, (di)propylene glycol monobutyl ethers and 1,2-alkylene glycol.

Di(tri)ethylene glycol monobutyl ether refers to diethylene glycol monobutyl ether (DEGmBE) and/or triethylene glycol monobutyl ether (TEGmBE). The content of di(tri) ethylene glycol monobutyl ether is preferably 20% or less as the required level for penetration, more preferably 0.5% to 10%. If 20% is exceeded, the improving effect of the di(tri)ethylene glycol monobutyl ether on the print quality plateaus and the ink viscosity increases.

The (di)propylene glycol monobutyl ether refers to propylene glycol monobutyl ether (PGmBE) and/or dipropylene glycol monobutyl ether (DPGmBE). The content of the (di)propylene glycol monobutyl ether is preferably 10% or less as the required level for penetration, more preferably 0.5% to 5%. If 10% is exceeded, the improving effect of the (di)propylene glycol monobutyl ether on the print quality plateaus, and the ink viscosity increases. Moreover, a dissolution accelerator has to be added because of the low water-solubility.

To obtain a surface tension within a proper range, it is preferable that the content of each of the di(tri)ethylene glycol monobutyl ether, the (di)propylene glycol monobutyl ether, and the 1,2-alkylene glycol be 0.5% or more, but not more than 30%.

It is preferable that 1,2-hexanediol and/or 1,2-pentanediol be used as the 1,2-alkylene glycol. These substances can either be used alone or two of them can be used together. The addition of the 1,2-alkylene glycol enhances the drying characteristics of the printed matter. Accordingly, even when a number of pages are printed in succession, the print on a previous page is not transferred to the back of the following page. Thus, high-speed printing becomes possible with the inkjet recording method.

It is preferably that the 1,2-alkylene glycol have 4 to 10 carbons. A 1,2-alkylene glycol having 3 or less carbons has little enhancing effect on the ink penetration. If the water-base ink of the present invention contains a 1,2-alkylene glycol having more than 15 carbons, the water-solubility of the ink decreases. Therefore, it becomes necessary to add a solubilizing agent, however, adding the solubilizing agent increases the ink viscosity. Accordingly, it becomes necessary to introduce a water-soluble group such as a sulfone group and a phosphate group or a structure in which ethylene oxide is added. A 1,2-alkylene glycol having 4 and more carbons may have a structure in which one of these water-soluble groups is introduced, in this case, the number of the carbons can be any number under 30.

The content of the 1,2-alkylene glycol is preferably 15% or less. If 15% is exceeded, ink penetration plateaus and the print quality can no longer be enhanced by further adding the 1,2-alkylene glycol. Moreover, the ink viscosity increases, and accordingly, the print will be easily distorted.

It is preferable that the 1,2-alkylene glycol be a 1,2-pentanediol and/or a 1,2-hexanediol.

The content of the 1,2-pentanediol is preferably 3% to 15%. If the content is less than 3%, there is little improvement in the ink penetration. An water-base ink having the 1,2-pentanediol content of more than 15% has a low degree of water-solubility, accordingly, if such water-base ink is used in the present invention, it becomes necessary to add the solubilizing agent. However, since adding the solubilizing agent increases the ink viscosity, the aforementioned water-soluble group needs to be introduced.

The content of the 1,2-hexanediol is preferably 0.5% to 10%. If the content is less than 0.5%, there is little improvement in the ink penetration. If the content is more than 10%, such water-base ink has a low degree of water-solubility. Accordingly, if such water-base ink is used in the present invention, it is necessary to add the solubilizing agent. However, since adding the soubilizing agent increases the ink viscosity, it becomes necessary to introduce the aforementioned water-soluble group.

It is preferable that the surfactant and the penetrating organic solvent be contained together, so that print quality can be further enhanced.

The total content of the surfactant and the penetrating organic solvent is preferably 0.5% to 30%, more preferably 1% to 15%. If the content is less than 0.5%, the print quality can not be enhanced since the effect of the added penetrating organic solvent is small. If the content is more than 30%, the ink viscosity increases and the print will be easily distorted. Adding more of these substances have no further improvement on the print quality.

Even a small amount of the surfactant improves ink penetration. Accordingly, in terms of improving the print quality, it is preferable that the content of the penetrating organic solvent be 1% or more when the content of the surfactant is 0.5% or less.

In light of the print quality, it is preferable that the ratio of the surfactant content and the 1,2-alkylene glycol content be 1:0 to 1:10 when the content of the surfactant is 0.5% or more. If the 1,2-alkylene glycol content exceeds ten times the content of the surfactant, the print quality can no longer be improved. Adding more 1,2-alkylene glycol has no effect but instead increases the ink viscosity.

In order to ensure ink storage stability and ink discharge stability from the inkjet head, to prevent clogging and ink deterioration, various additives such as moisturizers, penetration-controlling agents, viscosity-adjusting agents, pH regulators, dissolution accelerators, antioxidants, preservatives, fungicides, corrosion inhibitors, chelating agents for catching metal ions that affect dispersion, and rust preventive agents, may be added to the water-base ink of the present invention. Examples of these substances are indicated below.

To keep inks from drying out in the nozzle surface of the inkjet, it is preferable to add water-soluble glycols to the water-base ink. Examples of the water-soluble glycols include, ethylene glycol, diethylene glycol, triethylene glycol, propylene glycol, dipropylene glycol, tripropylene glycol, polyethylene glycol with a Mw of 2,000 or less, 1,3-propylene glycol, isopropylene glycol, isobutylene glycol, 1,4-butanediol, 1,3-butanediol, 1,5-pentanediol, 1,6-hexanediol, glycerin, meso-erythritol, and penta erythritol.

Various types of saccharides may also be used in the water-base ink of the present invention so that clogging due to the dried ink in the nozzle can be prevented. Examples of the saccharides include monosaccharides and polysaccharides, with preferable examples including glucose, mannose, fructose, ribose, xylose, arabinose, lactose, galactose, aldonic acid, glucitose, maltose, cellobiose, sucrose, trehalose, maltotriose, as well as alginic acid and its salts, cyclodextrins, and celluloses.

It is preferable that the content of the saccharides be 0.05% or more, but not more than 30%, more preferably 3% to 20%. If the content is less than 0.05%, there is little improvement in the clogging phenomenon due to the dried ink at the tip of the head. On the contrary, if the content is more than 30%, the ink viscosity increases and proper printing can no longer be performed. In the case of using alginic acid and its salts, cyclodextrins, or celluloses to form an ink, the content needs to be controlled so that the ink viscosity will not be too high.

In addition to the above substances, the following are examples of substances that can be used for enhancing the solubility of glycol ethers and other ink elements having low water-solubility when contained in inks, for enhancing ink penetration to recording media such as paper, and for reducing nozzle clogging: alkyl alcohols having 1 to 4 carbons such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethylsulfoxide; sorbit; sorbitan; monoacetin; diacetin; triacetin; sulfolane; paratoluenesulfonamide; and paratoluenesulfonamide-4-ethyleneoxy adduct. These substances can be properly selected and used.

Other surfactants can also be added to the ink of the present invention in order to control the ink penetration into recording media such as paper and special paper. It is preferable that the surfactants to be added have good compatibility with the ink solvents of the present invention, and have a higher degree of penetration and stability compared to other surfactants. Examples of such surfactants include amphoteric surfactants and nonionic surfactants.

Examples of the amphoteric surfactants include: lauryldimethyl aminoacetate betaine; 2-alkyl-N-carboxymethyl-N-hydroxyethylimidazolinium betaine; coconut oil fatty acid amidopropyldimethylaminoacetate betaine; polyoctylpolyaminoethyl glycine; and imidazoline derivatives.

Examples of nonionic surfactants include: ether-based surfactants such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkylether (polyoxypropylene polyoxyethylene alkylether); ester-based surfactants such as polyoxyethylene oleate, polyoxyethylene ester oleate, polyoxyethylene ester distearate, sorbitan laurate, sorbitan monostearate, sorbitan monooleate, sorbitan sesquioleate, polyoxyethylene monooleate, and polyoxyethylene stearate; and fluorine-based surfactants such as fluorinated alkyl ester, and perfluoroalkyl carboxylate.

Examples of the pH regulators, the dissolution accelerators and the antioxidants include: amines and transformations thereof such as diethanolamine, triethanolamine, propanolamine, and morpholine; inorganic salts such as potassium hydroxide, sodium hydroxide, and lithium hydroxide; ammonium hydroxide; quaternary ammonium hydroxide (tetramethylammonium, etc.); carbonates such as potassium (hydrogen) carbonate, sodium (hydrogen) carbonate, and lithium (hydrogen) carbonate; phosphates; N-methyl-2-pyrrolidone; ureas such as urea, thiourea, and tetramethylurea; alohanates such as alohanate and methyl alohanate; biurets such as biuret, dimethyl biuret, tetramethyl biuret; and L-ascorbic acid and salts thereof. Commercially available antioxidants and UV absorbing agents, for example, Tinuvin 328, 900, 1130, 384, 292, 123, 144, 622, 770 and 292 available from Ciba-Geigy Japan Limited; Irgacor 252 and 153; Irganox 1010, 1076 and 1035; MD1024; and lanthanide oxides may also be used.

Examples of the viscosity adjusting agents include, rosins, alginates, polyvinyl alcohol, hydroxypropyl cellulose, carboxymethyl cellulose, hydroxyethyl cellulose, methyl cellulose, polyacrylates, polyvinylpyrrolidone, and Arabic gum starch.

Examples of the preservatives include alkyl isothiazolone, chloralkyl isothiazolone, benzisothiazolone, bromonitro alcohol, oxazolidine type compounds and/or chloroxylenol. Examples of the chelating agents include ethylenediamine acetate, and salts of nitrilotriacetic acid. Examples of the rust preventive agents include dicyclohexylammonium nitrate and benzotriazole.

Examples of the preservatives are: alkylisothiazolones having octylisothiazolone, a type of alkylisothiazolone, as an active ingredient (for example, NS-800H, NS800G, and NS-800P all available from Nagase Chemitex Corporation); chrolalkylisothiazolones having chrolisomethylthiazolone, a type of chrolalkylisothiazolone as its active ingredient (for example, NS-500W, NS80D, NS-CG, NS-TM, and NS-RS all available from Nagase Chemitex Corporation); preservatives having benzisothiazolone as its active ingredients (for example, Proxel BDN, Proxel BD20, Proxel GXL, Proxel LV, Proxel TN all available from Zeneca, UK, as well as Denicide BIT and Denicide NIPA both available from Nagase Chemitex Corporation); preservatives having bromonitro alcohol as its active ingredients (for example, Bronopol, Miacide BT, Miacide AS all available from Nagase Chemitex Corporation); and preservatives having chrolxylenol as its active ingredients (for example, PCMX available from Nagase Chemitex Corporation). Preservatives having oxazolidine type compounds as its active ingredients and preservatives having mixtures or transformations of the above-listed ingredients as its active ingredients are also commercially available for application purposes (for example, NS-BP, Denicide BIT-20N, Denicide SPB, Saniset HP, Microstat S520, Saniset SK2, Denicide NS-100, Denicide BF-1, Denicide C3H, Saniset 161, Denicide CSA, Denicide CST, Denicide C3, Denicide OMP, Denicide XR-6, Denicide NM, Moldenize N760, Denistat P4, Denistat P-8, Denistat CHR all available from Nagase Chemitex Corporation). Among these, the substances having oxazolidine type compounds, chrolisomethylthiazolone, or benzisothiazolone as active ingredients have profound effects on water-base inks. It is preferable that a preservative to be used in an water-base ink have a combination of two or more of the above-listed substances having different structures, rather than having a single substance, so that the growth of resistant bacteria can be better prevented.

Examples of the ethylenediamine acetate that can be used as the chelating agent, include ethylenediamine diacetate free acid, ethylenediamine tetraacetate free acid, disodium salt, trisodium salt, and tetrasodium salt. Among these, disodium salt, trisodium salt and tetrasodium salt are preferably used. Examples of the salts of nitrilotriacetate acid that can also be used as the chelating agent, include nitrilotriacetate acid free acid, monosodium salt, disodium salt, and trisodium salt. Among these, monosodium salt, disodium salt and trisodium salt are preferably used. In addition, lithium salt, potassium salt, ammonium salt, and triethanolamine salt are also effective for water-base inks. The ethylenediamine acetate and the salts of nitrilotriacetate acid have a preventative effect on aggregation and deterioration of the pigment due to the presence of metal ions in the ink passages of the ink cartridge and ink head.

Dicyclohexylammonium nitrate and benzotriazole are effective as rust preventive agents. The rust preventive agents are used when a printer head is made from metal. Inks are not jetted properly when the nozzle rusts. Accordingly, the rust preventive agents are especially effective if the nozzle has a rust-prone plated surface.

[Water-Base Ink Set]

The present invention also provides an water-base ink set comprising the aforementioned water-base ink (cyan ink), magenta ink, and yellow ink. The magenta ink and the yellow ink respectively contain a pigment, a surfactant, a penetrating organic solvent, and water. The surfactant is an acetylene glycol surfactant and/or an acetylene alcohol type surfactant. The penetrating organic solvent is one or more selected from the group consisting of di(tri)ethylene glycol monobutyl ether and/or (di)propylene glycol monobutyl ether, and 1,2-alkylene glycol.

As a pigment used for the magenta ink, it is preferable to use one or more selected from the group consisting of C.I. pigment red 122, a solid solution of C.I. pigment red 122 and C.I. pigment red 254, C.I. pigment violet 19, and a solid solution of C.I. pigment red 122 and C.I. pigment violet 19. "Solid solution" refers to a mixed crystal (a crystalline in a mixed state) comprising a plurality of pigment molecules.

It is preferable that a pigment used for the yellow ink be C.I. pigment yellow 74.

It is preferable that the mean particle diameter of a pigment used for the magenta ink be 80 nm or less and that the mean particle diameter of a pigment used for the yellow ink be 100 nm or less. By setting the diameters below these values, the glossiness of images on glossy paper can be enhanced.

The water-base ink set of the present invention may comprise a black ink including carbon black. Raven C (made by Columbian Carbon), for example, can be used as the carbon black.

For matters regarding the ink set of the present invention that were not particularly mentioned, they will instead be explained by appropriately applying the matters regarding the aforementioned water-base ink.

[Embodiments]

Next, the present invention is further explained in details with embodiments. The present invention, however, will not be limited in any way by the embodiments. Explanations are given by taking inkjet recording inks as examples of water-base inks.

(Preparation of Dispersed Solutions 1 to 4)

After substituting with nitrogen the atmosphere in a reaction container comprising an agitator, a thermometer, a circulating current tube, and a dropping funnel, 20 parts styrene, 5 parts 2-ethylhexyl methacrylate, 15 parts butyl methacrylate, 10 parts lauryl methacrylate, 2 parts methacryl acid, and 0.3 parts t-dodecyl mercaptan were introduced into the reaction container and heated to 70° C. 150 parts styrene, 15 parts acrylic acid, 50 parts butyl methacrylate, 1 part t-dodecyl mercaptan, 20 parts methyl ethyl ketone, and 1 part azobis isobutyronitrile, that were prepared separately, were introduced into the dropping funnel and instilled into the reaction container for four hours to cause a polymerization reaction. Then, methyl ethyl ketone was added to the reaction container to prepare a dispersion polymer solution having a concentration of 40%.

Next, 40 parts the dispersion polymer solution, 30 parts dichloro copper phthalocyanine (DiCl-ph, made by Sanyo Color Works, Ltd.), 100 parts sodium hydroxide solution of 0.1 mol/L, and 30 parts methyl ethyl ketone were mixed and agitated for thirty minutes with a homogenizer. Thereafter, 300 parts ion-exchange water were added to the solution and agitated for another one hour. Then, the entire amount of methyl ethyl ketone and some parts of water were evaporated using a rotary evaporator, and the solution was neutralized with 0.1 mol/L of sodium hydeoxide to adjust the pH value of the solution to pH9. Thereafter, the solution was filtered with a membrane filter having a pore size of 0.3 μm. As a result, a dispersed solution 1 having a solid part content (dichloro copper phthalocyanine and dispersion polymer) of 20% was obtained.

Dispersed solutions 2 to 4 were prepared in the same manner. Dispersed solution 2 was obtained using trichloro copper phthalocyanine (TriCl-ph, made by Sanyo Color Works). Dispersed solution 3 was obtained using tetrachloro copper phthalocyanine (TetCl-ph, Sanyo Color Works). Dispersed solution 4 was obtained using pentachloro copper phthalocyanine (PenCl-ph, made by Sanyo Color Works). Just as in the case of dispersed solution 1, dispersed solutions 2 to 4 were prepared such that the weight ratio between a dispersion polymer and a pigment is 20:80.

(Preparation of Dispersed Solutions 5 to 11)

Dispersed solutions 5 to 11 were prepared in the same manner as in the case of dispersed solutions 1 to 4 except that different pigments were used for dispersed solutions 5 to 11. Dispersed solution 5 was obtained using pigment blue 15:3 (PB15:3, copper phthalocyanine pigment: made by Clariant). Dispersed solution 6 was obtained using pigment red 122 (PR122, dimethyl quinacridone: made by Clariant). Dispersed solution 7 was obtained using a solid solution of C.I. pigment red 122 and C.I. pigment violet 19 (PR122+ PV19, made by Dainippon Ink and Chemicals Incorporated). Dispersed solution 8 was obtained using C.I. pigment violet 19 (PV19, made by Clariant). Dispersed solution 9 was obtained using a solid solution of C.I. pigment red 122 and C.I. pigment red 254 (PR 122+PR254, Dainippon Ink and Chemicals). Dispersed solution 10 was obtained using pigment yellow 74 (PY74, condensed azo pigments: made by Clariant). Dispersed solution 11 was obtained using Raven C (K, made by Columbian Carbon) which is carbon black.

(Example of Preparing Inkjet Ink)

Table 1 shows compositions of inkjet recording inks 1 to 11 as specific examples of water-base inks. A content of a dispersed solution in each ink is indicated as the solids concentration (total amount of a pigment and a dispersion polymer) of the dispersed solution measured in terms of weight. Ion-exchange water used in the respective ink compositions was the ion-exchange water in which the content of Topside 240 (made by Permachem Asia, Ltd.) for preventing ink corrosion is 0.05%, the content of benzotriazole for preventing corrosion of the inkjet head material is 0.02%, and the content of EDTA (ethylenediaminetetraacetic acid)-disodium salt for decreasing the influence of metal ions in the ink compositions is 0.04%.

TABLE 1

| | Ink (pigment) | | | | | | | | | | |
|---|---|---|---|---|---|---|---|---|---|---|---|
| Ink composition (wt %) | 1 (DiCl-ph) | 2 (TriCl-ph) | 3 (TetCl-ph) | 4 (PenCl-ph) | 5 (PB15:3) | 6 (PR122) | 7 (PR122 + PV19) | 8 (PV19) | 9 (PR122 + PR254) | 10 (PY74) | 11 (K) |
| Dispersed solution 1 | 7.5 | — | — | — | — | — | — | — | — | — | — |
| Dispersed solution 2 | — | 5.0 | — | — | — | — | — | — | — | — | — |
| Dispersed solution 3 | — | — | 6.5 | — | — | — | — | — | — | — | — |
| Dispersed solution 4 | — | — | — | 7.0 | — | — | — | — | — | — | — |
| Dispersed solution 5 | — | — | — | — | 5.0 | — | — | — | — | — | — |

TABLE 1-continued

| Ink composition (wt %) | Ink (pigment) | | | | | | | | | | |
|---|---|---|---|---|---|---|---|---|---|---|---|
| | 1 (DiCl-ph) | 2 (TriCl-ph) | 3 (TetCl-ph) | 4 (PenCl-ph) | 5 (PB15:3) | 6 (PR122) | 7 (PR122 + PV19) | 8 (PV19) | 9 (PR122 + PR254) | 10 (PY74) | 11 (K) |
| Dispersed solution 6 | — | — | — | — | — | 7.0 | — | — | — | — | — |
| Dispersed solution 7 | — | — | — | — | — | — | 6.0 | — | — | — | — |
| Dispersed solution 8 | — | — | — | — | — | — | — | 6.5 | — | — | — |
| Dispersed solution 9 | — | — | — | — | — | — | — | — | 6.5 | — | — |
| Dispersed solution 10 | — | — | — | — | — | — | — | — | — | 8.0 | — |
| Dispersed solution 11 | — | — | — | — | — | — | — | — | — | — | 6.0 |
| DEGmBE | — | 10.0 | — | — | — | — | 10.0 | 10.0 | 10.0 | 10.0 | 10.0 |
| TEGmBE | 5.0 | — | — | 3.0 | 6.0 | 1.0 | — | — | — | — | — |
| PGmBE | — | — | — | — | — | — | — | — | — | 2.0 | — |
| DPGmBE | — | — | — | — | — | — | — | — | — | — | 2.0 |
| 1,2-hexanediol | — | — | 4.0 | — | — | 4.0 | — | — | — | — | — |
| 1,2-pentanediol | — | — | — | 5.0 | — | — | — | — | — | — | — |
| Glycerin | 17.0 | 17.0 | 16.0 | 15.0 | 15.0 | 15.0 | 17.0 | 17.0 | 17.0 | 9.0 | 14.0 |
| Triethylene glycol | — | — | 7.0 | — | — | — | — | — | — | 5.0 | 2.0 |
| Tetraethylene glycol | — | — | 1.5 | 9.0 | — | — | — | — | — | — | — |
| Dipropylene glycol | — | 5.0 | — | — | — | — | 5.0 | 5.0 | 5.0 | — | — |
| Trimethylolpropane | — | — | — | 2.0 | 1.0 | 8.0 | — | — | — | — | — |
| 2-pyrrolidone | 5.0 | — | 2.0 | 2.0 | 2.0 | — | — | — | — | — | — |
| Olfine E1010 | 1.0 | 1.2 | — | — | 1.0 | 0.1 | 1.2 | 1.2 | 1.2 | — | — |
| Olfine STG | — | — | 0.5 | — | — | — | — | — | — | 1.0 | — |
| Surfynol 61 | — | — | — | 0.5 | — | — | — | — | — | — | — |
| Triethanolamine | 0.8 | 0.9 | 1.0 | 0.7 | 0.9 | — | 0.9 | 0.9 | 0.9 | 0.9 | 0.9 |
| Ion-exchange water | Remainder | Remainder | Remainder | Remainder | Remainder | Remainder | Remainder | Remainder | Remainder | Remainder | Remainder |

In Table 1, the respective abbreviations indicate as follows.
TEGmBE: triethylene glycol monobutyl ether
Olfine E1010 (acetylene glycol type surfactant: made by Nisshin Chemical)
DEGmBE: diethylene glycol monobutyl ether
Ofine STG (acetylene glycol type surfactant: made by Nisshin Chemical)
Surfynol 61 (acetylene alcohol type surfactant: made by Air Products, US)
DPGmBE: dipropylene glycol monobutyl ether PGmBE: propylene glycol monobutyl ether (Gas Fastness Evaluation)

Table 2 shows the evaluation results of gas fastness. In this evaluation, ozone was used as the gas. Specimens were images printed on plain paper (Xerox 4024) in a fine mode using the EM930C inkjet printer (manufactured by Seiko Epson Corporation) in which inks 1 to 11 were loaded. Decreasing rates (%) of optical density values (OD values) were obtained when the specimen had been left for 200 hours under the conditions where the ozone concentration was 50 ppm, 100 ppm and 200 ppm. Regarding an evaluation criterion, inks exhibiting decreasing rates of 10% or less under the ozone concentration 50 ppm were judged good As is clear from the results in Table 2, the cyan ink, which contains the copper phthalocyanine pigment substituted with chlorine atoms, used in inks 1 to 4 has better gas fastness compared to the cyan ink, which contains C.I. pigment blue 15:3, used in ink 5. It is also apparent that when pigment blue 15:3 was used as a cyan pigment, the colors in the images formed using the cyan color faded and the OD value changed, thus resulting in poorly balanced image quality.

TABLE 2

| | Embodiments | | | | Comparative Example | Ink 6 (PR122) | Ink 7 (PR122 + PV19) | Ink 8 (PV19) | Ink 9 (PR122 + PR254) | Ink 10 (PY74) | Ink 11 (K) |
|---|---|---|---|---|---|---|---|---|---|---|---|
| Ozone concentration | Ink 1 (DiCl-ph) | Ink 2 (TriCl-ph) | Ink 3 (TetCl-ph) | Ink 4 (PenCl-ph) | Ink 5 (PB15:3) | | | | | | |
| 50 ppm | 5.2 | 4.1 | 3.0 | 2.5 | 15.6 | 3.0 | 4.1 | 4.1 | 3.0 | 3.5 | 1.5 |
| 100 ppm | 7.5 | 6.0 | 3.5 | 2.8 | 22.3 | 5.2 | 6.0 | 6.0 | 4.1 | 5.0 | 2.0 |
| 200 ppm | 10.2 | 8.1 | 4.1 | 3.4 | 30.2 | 5.2 | 8.1 | 8.1 | 8.2 | 7.8 | 3.0 |

(Print Quality Evaluation)

Table 3 shows the evaluation results for the printing quality of characters that were printed using inks 1 to 4. The printing quality was measured using the EM 930C inkjet printer (manufactured by Seiko Epson Corporation). Paper used in this evaluation was plain paper commercially available in Europe, the United States, and Japan, for example, Conqueror Paper, Favorit Paper, Modo Copy Paper, Rapid Copy Paper, EPSON EPP Paper, Xerox 4024 Paper, Xerox 10 Paper, Neenha Bond Paper, Ricopy 6200, Yamayuri Paper, and Xerox R.

With word-processing software (Microsoft Word), the Chinese character "書" (sho) was printed on paper using the font MS Mincho at a font size of 10.5 points. The print quality of the Chinese character was measured for each respective ink. The evaluation criteria were set as follows: grade A for inks enabling to print the character "書" with no smearing of the character; grade B for inks causing one part of the character to smear; grade C for inks causing two or three parts of the character to smear; and grade D for inks causing four or more lines of the character to smear.

Inks 1 to 4 in the embodiments of Table 3 have the same compositions as inks 1 to 4 in the Table 1 respectively. Inks 1-5, 2-5, 3-5, and 4-5 were prepared by changing the compositions, except for the dispersed solution, of inks 1 to 4 in Table 1 respectively to the composition of ink 5 of Table 1. Inks 21 to 24 in the comparative examples were prepared by removing, from the respective inks 1 to 4 of Table 1, one or more substances that are preferably used in the present invention from the group consisting of an acetylene glycol surfactant and/or an acetylene alcohol type surfactant, di(tri) ethylene glycol monobutyl ether and/or (di)propylene glycol monobutyl ether, and 1,2-alkylene glycol, and instead glycerin was added.

As can be seen from the results in Table 3, the inks used in the comparative examples produce print images of low quality. However, the inkjet recording inks of the present invention can produce high-quality print.

As explained, the water-base inks of the present invention can provide inkjet recording inks of high quality and practicability, preventing smearing of print images on recording media such as paper.

by HORIBA, Ltd.). Five measurements were taken for each printed paper and an average value of glossiness was obtained. Pigments obtaining an average value above 50 were judged good.

Glossiness differs according to the mean particle diameters of pigments. It was found that a mean particle diameter of a pigment used in cyan ink, that is trichloro copper phthalocyanine pigment substituted with eight chlorine atoms, is preferably 80 nm or less.

It was also found that the mean particle diameter of a pigment used in magenta ink is preferably 80 nm or less, and that the mean particle diameter of a pigment used in yellow ink is preferably 100 nm or less.

TABLE 4

| Mean Particle Diameter of Pigment | Cyan TriCl-ph | Magenta PR122 + PV19 | PV19 | PR122 + PR254 | Yellow PY74 |
|---|---|---|---|---|---|
| 150 nm | 31.8 | 31.4 | 30.2 | 32.3 | 42.0 |
| 120 nm | 35.6 | 35.9 | 34.6 | 37.6 | 48.7 |
| 100 nm | 43.8 | 45.1 | 44.0 | 46.3 | 54.6 |
| 90 nm | 48.9 | 48.2 | 47.3 | 49.6 | 61.5 |
| 80 nm | 57.6 | 60.1 | 58.6 | 62.4 | 68.5 |
| 70 nm | 64.2 | 66.3 | 65.2 | 68.7 | 72.5 |

TABLE 3

| Paper | Embodiments | | | | | | | | Comparative examples | | | |
|---|---|---|---|---|---|---|---|---|---|---|---|---|
| | Ink 1 | Ink 2 | Ink 3 | Ink 4 | Ink 1-5 | Ink 2-5 | Ink 3-5 | Ink 4-5 | Ink 21 | Ink 22 | Ink 23 | Ink 24 |
| Conqueror | A | A | A | A | A | A | A | A | C | C | C | C |
| Favorit | A | A | A | A | A | A | A | A | D | D | D | D |
| Modo Copy | A | A | A | A | A | A | A | A | D | D | D | D |
| Rapid Copy | A | A | A | A | A | A | A | A | D | D | D | D |
| EPSON EPP | A | A | A | A | A | A | A | A | C | C | C | C |
| Xerox 4024 | A | A | A | A | A | A | A | A | C | C | C | D |
| Xerox 10 | A | A | A | A | A | A | A | A | D | D | D | D |
| Neenha Bond | A | A | A | A | A | A | A | A | C | C | D | D |
| Ricopy 6200 | A | A | A | A | A | A | A | A | D | D | C | D |
| Yamayuri | A | A | A | A | A | A | A | A | D | D | D | D |
| Xerox R | A | A | A | A | A | A | A | A | D | D | D | D |

(Glossiness Evaluation)

Table 4 shows the results of the glossiness measurements performed for the respective pigments used in the water-base inks, by diversely changing the mean particle diameters of each pigment. Specifically, measurements were conducted on trichloro copper phthalocyanine (TriCl-ph) as the pigment for the cyan ink; a solid solution of C.I. pigment red 122 and C.I. pigment violet 19 (PR122+PV19), C.I. pigment violet 19 (PV19), and a solid solution of C.I. pigment rd 122 and C.I. pigment red 254 (PR122+PR254) as the pigments for the magenta ink; and C.I. pigment yellow 74 (PY74) as the pigment for the yellow ink. Microtrac UPA 150 (manufactured by Nikkiso Co., Ltd.) was used to measure the mean particle diameters of the pigments.

Solid printing was performed onto PM photo paper (manufactured by Seiko Epson Corporation) at 720×720 dpi, using the EM930 inkjet printer (manufactured by Seiko Epson Corporation). For each printed paper, specular gloss of the recording surface at an incidence angle of 60 degrees was measured using a gloss checker (IG-320: manuactured TABLE 4-continued

| Mean Particle Diameter of Pigment | Cyan TriCl-ph | Magenta PR122 + PV19 | PV19 | PR122 + PR254 | Yellow PY74 |
|---|---|---|---|---|---|
| 60 nm | 68.8 | 71.2 | 70.2 | 73.2 | 74.3 |
| 50 nm | 73.5 | 73.6 | 72.7 | 75.1 | 75.0 |

(Metamerism Evaluation)

Metamerism (light source dependence) of colors of printed matter were evaluated using ink sets, each ink set comprising a cyan ink, a magenta ink and an yellow ink. Inks 1 to 4 of the present invention were respectively used as a cyan ink for each set of the embodiments, while ink 5 (C.I. pigment blue 15:3) was used as a cyan ink for a comparative example. Ink 6 (C.I. pigment red 122), ink 7 (a solid solution of C.I. pigment red 122 and C.I. pigment violet), ink 8 (C.I. pigment violet 19), and ink 9 (a solid solution of C.I. pigment red 122 and C.I. pigment red 254) were respectively used as a magenta ink for each of the embodiments. Ink 10 (C.I. pigment yellow 74) was used as a yellow ink for all the ink sets.

Metamerism of the printed matter was evaluated as follows. First, a composite gray was prepared using each ink set consisting of a cyan ink, a magenta ink, and an yellow ink. The variations ($\Delta E$) in the tone of the gray color between when viewed with light source D2 and viewed with light source F11 were measured. By using the Gretag Macbeth Spectroscan (manufactured by Gretag), the variations ($\Delta E$) were measured to ten types of gray color having different OD values, and the absolute values of maximum values were obtained. Results are shown in Table 5. Regarding an evaluation criterion, ink sets exhibiting $|\Delta E|$ of 10 or less were judged good.

As can be seen from the results in Table 5, with the ink sets of the present invention, it is possible to obtain printed matter exhibiting low light source dependence.

TABLE 5

| | Embodiments | | | |
|---|---|---|---|---|
| Ink (C + M + Y) | 1 + 6 + 10 | 2 + 6 + 10 | 3 + 6 + 10 | 4 + 6 + 10 |
| $|\Delta E|$ | 5.0 | 4.1 | 3.6 | 3.1 |
| Ink (C + M + Y) | 1 + 7 + 10 | 2 + 7 + 10 | 3 + 7 + 10 | 4 + 7 + 10 |
| $|\Delta E|$ | 4.5 | 3.0 | 2.8 | 2.2 |
| Ink (C + M + Y) | 1 + 8 + 10 | 2 + 8 + 10 | 3 + 8 + 10 | 4 + 8 + 10 |
| $|\Delta E|$ | 4.8 | 4.1 | 3.5 | 2.8 |
| Ink (C + M + Y) | 1 + 9 + 10 | 2 + 9 + 10 | 3 + 9 + 10 | 4 + 9 + 10 |
| $|\Delta E|$ | 4.0 | 2.4 | 2.3 | 1.8 |

| | Comparative Example |
|---|---|
| Ink (C + M + Y) | 5 + 6 + 10 |
| $|\Delta E|$ | 12.5 |

The present invention is not limited to the embodiments and various modifications may be made without departing from the gist of the present invention.

We claim:

1. A water-base ink comprising a pigment, a surfactant and/or a penetrating organic solvent, and water, wherein
   the pigment is a copper phthalocyanine pigment which is C.I. pigment blue 15:1 substituted with from 1–8 chlorine atoms;
   the surfactant is an acetylene glycol surfactant and/or an acetylene alcohol type surfactant; and
   the penetrating organic solvent is one or more selected from the group consisting of di(tri)ethylene glycol monobutyl ether and/or (di)propylene glycol monobutyl ether, and 1,2-alkylene glycol.

2. The water-base ink according to claim 1 wherein the total content of the surfactant and the penetrating organic solvent is 0.5 wt % or more, but not more than 30 wt %.

3. The water-base ink according to claim 1 wherein the content of the surfactant is 5 wt % or less.

4. The water-base ink according to claim 1 comprising the surfactant and the penetrating organic solvent at the same time.

5. The water-base ink according to claim 4 wherein the content of the surfactant is 0.01 wt % or more, but not more than 1.5 wt %, and the content of the penetrating organic solvent is 1 wt % or more.

6. The water-base ink according to claim 1 wherein the 1,2-alkylene glycol has 4 to 10 carbons and the content of the 1,2-alkylene glycol is 15 wt % or less.

7. The water-base ink according to claim 6 wherein the 1,2-alkylene glycol is 1,2-pentanediol and/or 1,2-hexanediol.

8. The water-base ink according to claim 1, wherein the copper phthalocyanine pigment substituted with 1–8 chlorine atoms is encapsulated in a dispersion polymer.

9. The water-base ink according to claim 1, wherein a mean particle diameter of the copper phthalocyanine pigment substituted with from 1–8 chlorine atoms is 80 nm or less.

10. A water-based ink set comprising a water-base ink according to claim 1, a magenta ink, and a yellow ink.

11. The water-based ink set according to claim 10, wherein
   the magenta ink and the yellow ink respectively comprise a pigment, a surfactant and/or a penetrating organic solvent, and water,
   the surfactant is an acetylene glycol surfactant and/or an acetylene alcohol type surfactant,
   the penetrating organic solvent is one or more selected from the group consisting of di(tri)ethylene glycol monobutyl ether and/or (di)propylene glycol monobutyl ether, and 1,2-alkylene glycol.

12. An The water-base ink set according to claim 11 wherein the pigment used in the magenta ink is at least one selected from the group consisting of C.I. pigment red 122, a solid solution of C.I. pigment red 122 and C.I. pigment violet 19, C.I. pigment violet 19, and a solid solution of C.I. pigment red 122 and C.I. pigment red 254.

13. The water-base ink set according to claim 12 wherein the mean particle diameter of the pigment used for the magenta ink is 80 nm or less.

14. The water-base ink set according to claim 11 wherein the pigment used for the yellow ink is C.I. pigment yellow 74.

15. The water-base ink set according to claim 11 wherein the mean particle diameter of the pigment used for the yellow ink is 100 nm or less.

16. The water-base ink set according to claim 11 further comprising a black ink containing carbon black.

17. The water-base ink according to claim 1, wherein the copper phthalocyanine pigment is substituted with from 2–6 chlorine atoms.

18. The water-base ink according to claim 17, wherein the copper phthalocyanine pigment is substituted with from 2–5 chlorine atoms.

19. The water-base ink according to claim 17 wherein the copper phthalocyanine pigment is present in an amount of from 1.0 to 12 wt %, and the total content of the surfactant and the penetrating organic solvent is 0.5 wt % or more, but not more than 30 wt %.

20. The water-base ink according to claim 19, wherein the surfactant is present in an amount of 0.01 wt % or more, but not more than 1.5 wt %, and the penetrating organic solvent is present in an amount of 1 wt % or more.

* * * * *